US010946602B2

(12) United States Patent
Guy et al.

(10) Patent No.: US 10,946,602 B2
(45) Date of Patent: Mar. 16, 2021

(54) DRUM AND METHOD FOR ASSEMBLING AN ADAPTER FOR MOUNTING A TIRE ON A WHEEL RIM

(71) Applicant: COMPAGNIE GENERALE DES ETABLISSEMENTS MICHELIN, Clermont-Ferrand (FR)

(72) Inventors: Thomas Guy, Clermont-Ferrand (FR); Patrick Marchal, Clermont-Ferrand (FR); Henri Hinc, Clermont-Ferrand (FR); David Hernandez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 258 days.

(21) Appl. No.: 15/776,508

(22) PCT Filed: Nov. 23, 2016

(86) PCT No.: PCT/FR2016/053061
§ 371 (c)(1),
(2) Date: May 16, 2018

(87) PCT Pub. No.: WO2017/089703
PCT Pub. Date: Jun. 1, 2017

(65) Prior Publication Data
US 2018/0326682 A1  Nov. 15, 2018

(30) Foreign Application Priority Data
Nov. 25, 2015  (FR) .................................... 1561358

(51) Int. Cl.
B29D 30/24  (2006.01)
(52) U.S. Cl.
CPC ................ *B29D 30/247* (2013.01)

(58) Field of Classification Search
CPC .... B29D 2030/3207; B29D 2030/2642; B29D 2030/2664; B29D 30/247; B29D 30/24;
(Continued)

(56) References Cited

U.S. PATENT DOCUMENTS 4,126,507 A    11/1978  Kim et al. ..................... 156/415
4,131,500 A *  12/1978  Wilde ................... B29D 30/247
                                                                156/131

(Continued)

FOREIGN PATENT DOCUMENTS

DE    1 172 841 B    6/1964
DE    1 172 8341 B   6/1964

(Continued)

OTHER PUBLICATIONS

ESpaceNet Translation of EP-0953434-B1 (Year: 2020).*

(Continued)

*Primary Examiner* — Robert C Dye
*Assistant Examiner* — Alexander D Booth
(74) *Attorney, Agent, or Firm* — Venable LLP

(57) ABSTRACT

A radially expandable building drum, in which is intended for manufacturing an adapter for mounting a tire on a wheel rim, includes a central shaft, a first set of segments, and a second set of segments. All of the segments are arranged circumferentially around the shaft to form a generally cylindrically shaped external face of the drum. The segments of the first set and the segments of the second set face one another axially. The drum is structured to allow a different radial expansion of the segments of the first set in relation to the segments of the second set, between two working positions.

14 Claims, 6 Drawing Sheets

(58) Field of Classification Search
CPC ...... B29D 2030/487; B29D 2030/2657; B60C 15/0236; B60C 15/0209; B60C 15/023; B60B 21/12; B60B 21/125
USPC .......................................................... 156/131
See application file for complete search history.

(56) References Cited

U.S. PATENT DOCUMENTS

| | | | | |
|---|---|---|---|---|
| 4,229,246 | A | 10/1980 | Vanderzee | 156/417 |
| 4,685,992 | A | 8/1987 | Irie | 156/396 |
| 5,156,713 | A * | 10/1992 | Ishii | B29D 30/2607 156/111 |
| 6,343,638 | B1 * | 2/2002 | Weaver | B29D 30/243 156/414 |
| 6,626,217 | B2 | 9/2003 | Bestgen | 152/379.4 |
| 7,287,568 | B2 * | 10/2007 | Roedseth | B29D 30/245 156/415 |
| 2004/0011470 | A1 | 1/2004 | Ravat | 156/417 |
| 2015/0059962 | A1 * | 3/2015 | Stoila | B29D 30/245 156/131 |
| 2017/0326826 | A1 | 11/2017 | Hinc et al. | B29D 30/32 |

FOREIGN PATENT DOCUMENTS

| | | | |
|---|---|---|---|
| EP | 0 953 434 A1 | 11/1999 | |
| EP | 0953434 B1 * | 3/2003 | ............. B29D 30/32 |
| EP | 1 347 875 B1 | 1/2005 | |
| WO | WO 00/78565 A1 | 12/2000 | |
| WO | WO-2016178180 A1 * | 11/2016 | ............. B29D 30/24 |

OTHER PUBLICATIONS

Juxtapose, YouDictionary.com, (accessed from https://web.archive.org/web/20071002124636/https://www.yourdictionary.com/juxtapose on Aug. 11, 2020) (Year: 2007).*

* cited by examiner

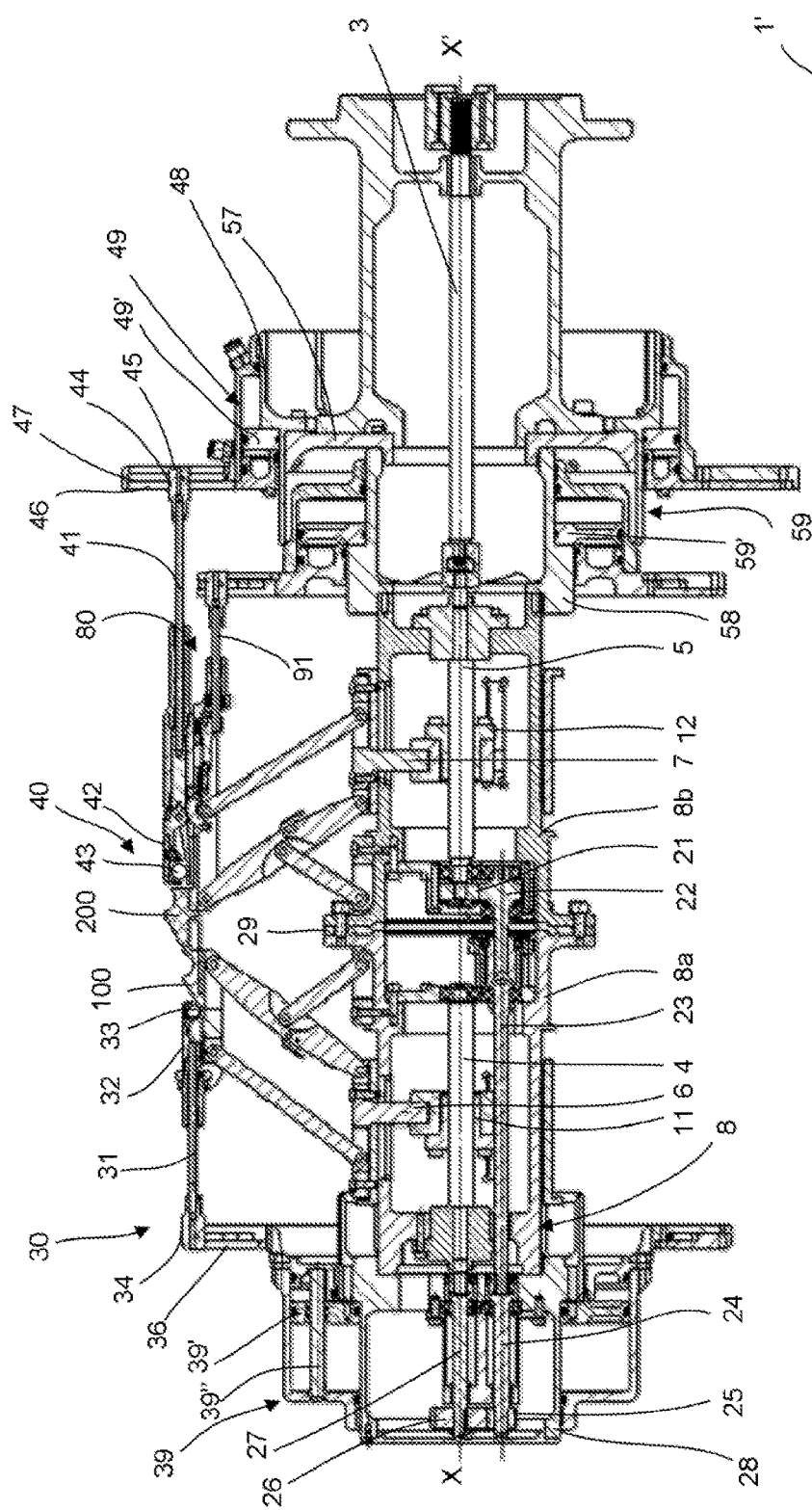
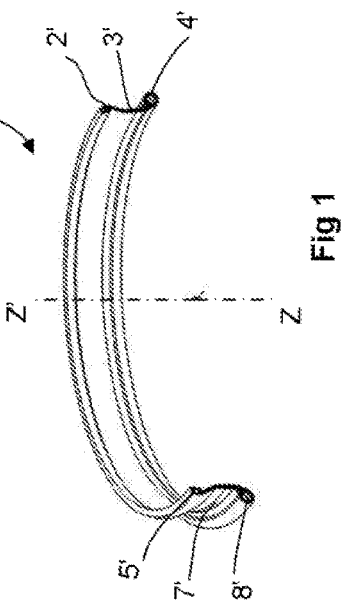
Fig 4
Fig 1

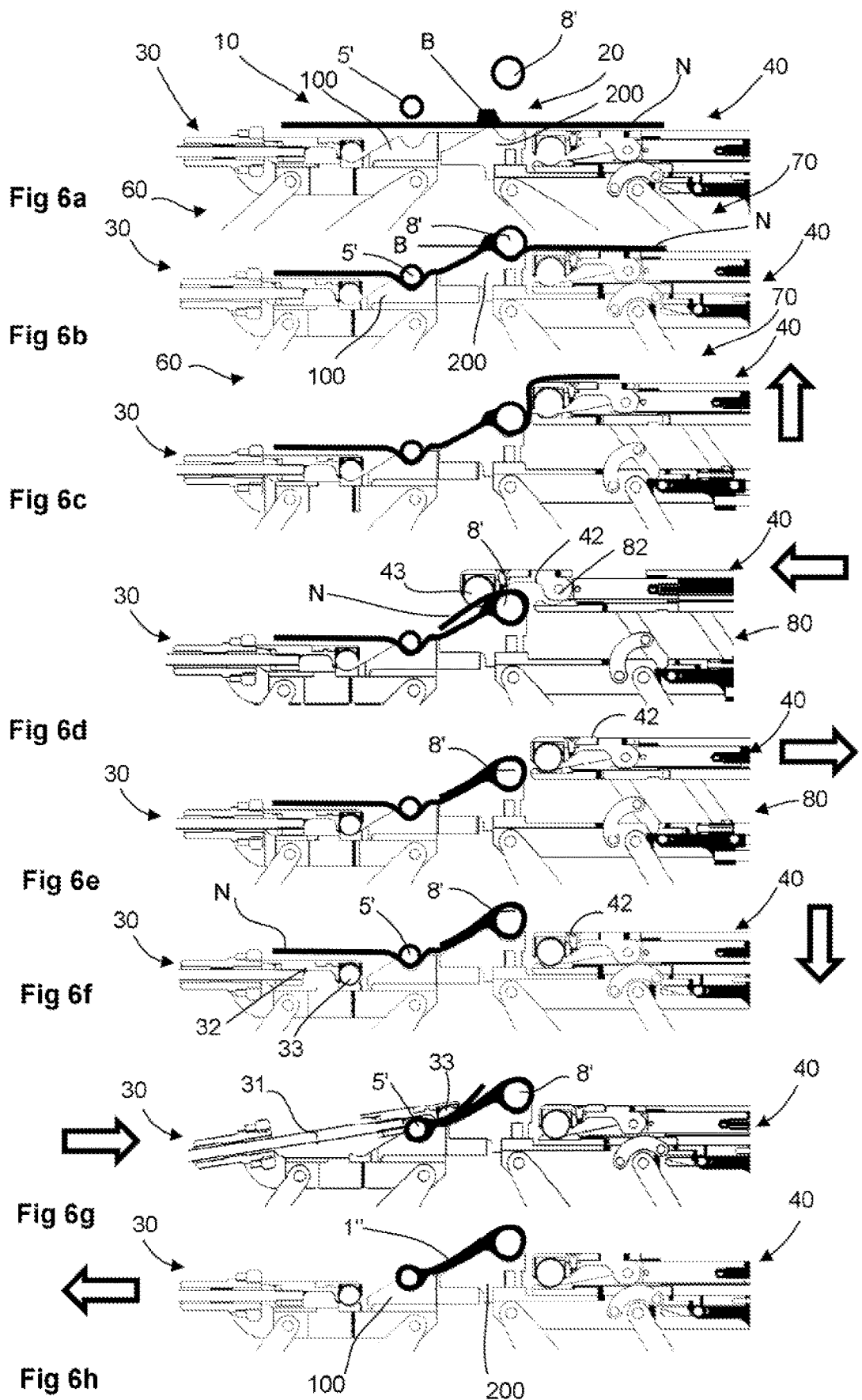

DRUM AND METHOD FOR ASSEMBLING AN ADAPTER FOR MOUNTING A TIRE ON A WHEEL RIM

FIELD OF THE INVENTION

The invention relates to a drum and to a method of assembly for the manufacture of a tire adapter used for mounting a tire on a wheel rim.

RELATED ART

Document WO 00/78565 discloses such an adapter produced based on reinforced rubber compounds elastically deformable in the axial and radial directions, two adapters connecting the rim to the beads of the tire making it possible to improve the properties of the latter.

More particularly, such an adapter generally comprises an interior bead which secures the adapter to the rim, an exterior bead intended to accept the bead of the tire, the interior and exterior beads being connected by a reinforcement that allows the adapter to deform elastically in the radial and axial directions. Such an adapter is created by stacking the various products based on rubber compounds on a support and is then vulcanized in a mould inside a vulcanizing press so that it acquires the desired elasticity properties.

Because of its functions and bearing in mind the requirements associated with mounting, the adapter has a tapering tubular overall shape of very specific profile. Specifically, the shape of the cross section of the adapter is determined by the shape of the cross section of the rim and by the type of associated tire and its profile is often complex as a result. In addition, the deformation of the adapter in the two, axial and radial, directions needs to have very precise predetermined values and, as a result, the adapter needs to conform to fairly strict dimensional tolerance conditions. In order to meet these conditions, it is planned for the various components to be assembled by laying them in succession on a rigid core and then vulcanizing in a suitable mould. Although this solution offers good implementational precision, it does nevertheless call for very complex tooling, requiring high levels of investment.

In order to manufacture such an adapter economically and on an industrial scale, bearing in mind its make-up and structure which are based on reinforcers and rubber products such as plies or profiled elements similar to those used in the manufacture of a tire, the use of a building drum has also been envisaged. However, such a drum needs to satisfy several conditions, a first being that is it has sites for accepting beads of different diameters.

Publication EP 0 953 434 describes a building drum for the manufacture of tires having beads of different diameters. This drum comprises at its ends grooves for receiving beads of different diameters and a retractable ring that covers the smaller-diameter groove in order to offer a cylindrical receiving surface on which to lay products that make up the carcass reinforcement. The ring is then removed axially to the outside of the drum in order to turn up the products laid on the drum. While admittedly this makes it possible to create green tires with beads of different diameters, the presence of such a ring entails precise positioning and adjustment with respect to the drum and moving it with respect to the drum has consequences regarding the space occupied thereby.

One solution to these problems is described in publication EP 1 347 875 which describes an expandable tire building drum for the manufacture of tires comprising a cylindrical central surface the ends of which have different diameters and devices for raising the ends of the carcass reinforcement which can be expanded with the drum and are also adjustable to each diameter when the drum is in the expanded position. Although this works satisfactorily for building a tire, this drum is nevertheless not suitable for building an adapter for mounting a tire on a wheel rim which, in addition to having a shape which differs from that of a tire, has beads of different diameters but situated a short distance, generally not exceeding 60 mm, apart.

Another source, document DE 1 172 841, discloses a green-tire finishing drum comprising two series of segments of different widths alternating circumferentially and able to pass from an expanded first position in which the external face of the drum has a cylindrical shape to a collapsed position in which the external face has a frustaconical shape of smaller diameter so as to allow the green tire to be extracted. The collapsing of the segments of one series is deferred in relation to that of the other series. Such a drum does not allow the building of a green form of tire adapter comprising two bead wires of different diameters.

BRIEF DESCRIPTION OF THE INVENTION

The object of the invention is a drum and a method for assembling an adapter for mounting a tire on a rim that makes it possible to at least partially overcome the aforementioned disadvantages and be able to manufacture such an adapter economically.

To this end, the invention proposes a radially expandable building drum intended for the manufacture of an adapter for mounting a tire on a rim, the drum comprising a central shaft, a first set of segments and a second set of segments, all the segments being arranged circumferentially around the shaft to form a substantially cylindrically shaped external face of the drum, characterized in that the segments of the first set and the segments of the second set face one another axially and in that the drum is designed to allow different radial expansion of the segments of the first set in relation to the segments of the second set of segments between two working positions.

The drum of the invention makes it possible to build the various components of the green form of adapter for mounting a tire on a rim, the adapter comprising two bead wires of different diameters, by laying what is referred to as "flat" when the drum is in the retracted position (or first working position), set so that the segments of each set are at the same diameter, thus generating a cylindrical external surface allowing for easy laying of the products. According to the invention, the segments of the first set and the segments of the second set face one another axially and, in a second working position, the drum creates a different radial expansion of the segments of one set in relation to the segments of the other set. What is meant by segments that face one another axially or are juxtaposed axially is segments which lie on the same generatrix of the drum, facing one another. In other words, the segments of the first and of the second set are arranged with their longitudinal axis in the one same vertical plane which intersects the axis of rotation of the drum. The segments of the first and the second set may be situated axially close together or distant from one another on the one same generatrix of the drum.

For preference, the segments of the first and second sets have the same width so as to form an external face of cylindrical overall shape when they are in the retracted position of the drum and thus allow the various rubber-based components to be laid flat correctly.

The drum also comprises means allowing the sectors of the first set and those of the second set to be moved radially so that a radial offset is formed between the two sets from the start of expansion of the drum and until the drum reaches the fully expanded position. This makes it possible, having laid the rubber components and the two bead wires of the green form flat, to entrap the two bead wires of different diameters within the plies already laid by radially expanding the drum into a second working position asymmetrically as seen with respect to a vertical midplane which is orthogonal to the main axis about which the drum rotates.

According to one advantageous aspect of the invention, the external face of each segment comprises a groove for accommodating a bead wire. This allows a bead wire to be positioned and then entrapped within the plies laid on the segments when the green form of the adapter is being built up.

Advantageously, the drum comprises means for moving the segments between a first working position in which the segments of the first and of the second sets are in the retracted position and the external face of the drum is substantially cylindrical in shape and has the one same diameter along its length, and a second working position in which the segments are in an expanded position so that the segments of the second set exhibit a greater diameter than the segments of the first set and the external face comprises two parts of substantially cylindrical shape of different diameters.

Thus, as the drum is expanding, a purely radial path is imparted to the segments of the first set and to the segments of the second set, making it possible to keep the distance between the bead wires constant throughout manufacture.

For preference, the axially internal face of the segments of the first set comprises teeth which axially interpenetrate with the teeth of the axially external face of the segments of the second set. This makes it possible to ensure continuity of the external face of the drum in the axial direction between the two cylindrical parts of different diameters of the drum in the expanded position and during the transition of the segments between the retracted and expanded positions.

For preference, the movement of the segments of the first set and of the segments of the second set is performed synchronously and continuously. This allows the plies of rubber to remain correctly in place and to be lengthened progressively as the segments expand.

In an alternative form, one set of segments is moved independently of the other, for example using two electric motors, each one driving one set of segments.

Advantageously, the drum comprises a single drive means driving the movement of the two sets of segments of the drum simultaneously. This allows all the segments of the two sets to be moved at the same time for greater precision and better tensioning of the plies.

For preference, the drive means is designed to move the two sets of segments at different speeds relative to one another. This allows all the segments to simultaneously reach the drum-expanded position quickly.

Advantageously, each set of segments is moved in radial translation using a screw—nut device and each screw receives the rotational movement of the central shaft. Such a device allows the rotational movement of the central shaft to be converted into an axial translational movement of the nut which then transmits it to a set of segments.

For preference, one of the screws of the device receives the rotational movement of the central shaft by means of a set of gears exhibiting a reduction ratio. This allows one of the screws to turn less quickly than the other and makes it possible to obtain different movement of one set of segments in relation to the other.

Advantageously, the pinions of the gearset are interchangeable and mounted with the possibility of synchronization in any relative position. This makes it possible to change the speed and therefore the magnitude of the radial movement of one set of segments with respect to the other as well as the diameter of the cylindrical external surface of the drum in the first working position.

For preference, each set of segments of the drum is connected to the screw—nut device by an articulated links mechanism. This makes it possible to convert the axial movement of the nut into a radial movement of the segments when the latter are situated a short axial distance apart.

Advantageously, the drum comprises a flexible sleeve designed to cover its external face. This makes it possible to have an external face that is smooth, thereby making it possible to preserve the integrity of the plies of rubber material laid on the building drum.

For preference, the drum comprises a ply-turning device situated each at one end of the drum and radially expandable at the same time as a set of segments. This allows assembly to be finalised by turning the edges of the plies using devices situated in the vicinity thereof.

Advantageously, said ply-turning devices are retractable under the external face of the drum so that they do not interfere with the laying of the components of the green form on the drum.

For preference, the drum comprises means for actuating a ply-turning device in an axial translational movement. This allows the device to push the edges of the plies on the rising face of the segments of the first set so as to make them pass over the bead wire.

Advantageously, the drum comprises means for actuating a ply-turning device in an axial translational movement and in a radial translational movement. This allows the device to push the edges of the plies on the falling face of the segments of the second set so as to make them pass over the bead wire.

The objects of the invention are also achieved using a method of assembly for the manufacture of a tire adapter used for mounting a tire on a wheel rim, comprising the following steps:
  laying the rubber components on a cylindrical surface of a radially expandable drum comprising two sets of segments facing one another axially, by rotating it;
  laying two bead wires on the rubber components in grooves provided for this purpose in each set of segments;
  differently radially expanding the segments of the first set in relation to the segments of the second set of segments between two working positions in order to entrap the bead wires within the rubber components.

Advantageously, the smaller-diameter bead wire is entrapped in a groove provided for that purpose in the first set of segments before the larger-diameter bead wire is entrapped. Thus, when the smaller-diameter bead wire is immobilized, the sliding of the products along the tapered inclined face of the drum is better controlled for greater precision.

For preference, the method according to one of the claims comprises steps of turning the ends of the rubber components around the bead wires.

BRIEF DESCRIPTION OF THE DRAWINGS

The invention will be better understood from the remainder of the description, which is based on the following figures:

FIG. 1 is a perspective view of an adapter sectioned along a plane passing through its axis of symmetry;

FIG. 4 is another view in axial section of the drum of FIG. 2;

FIGS. 6a to 6h schematically illustrate various steps in the method for manufacturing an unvulcanized green form of an adapter according to the invention;

FIG. 7 is a perspective view of another ply-turning device;

In the various figures, identical or similar elements bear the same references. Their description is therefore not systematically repeated.

DETAILED DESCRIPTION OF EMBODIMENTS OF THE INVENTION

FIG. 1 illustrates an adapter 1' sectioned along a plane passing through its axis of symmetry Z-Z'. The adapter 1' is intended to be mounted between a wheel rim and a tire (neither depicted) to form an assembly of the type described in document WO 00/78565 in the name of the Applicant Company. The adapter 1' to this end comprises an adapter bead 2' used for fixing to a wheel rim, an adapter reinforcement 3' which connects the bead 2' to an adapter reinforcer 4' able to be fixed around the bead of a tire. The adapter 1' is a component of annular overall shape having symmetry of revolution about the axis Z-Z'.

The renforcement 3' of the adapter 1' is formed on the basis of a main ply of radial and mutually parallel textile cords contained in a rubber base, like a carcass ply. This ply is arranged in such a way as to form a turnup around the reinforcer 4' of the adapter and, on the other hand, is anchored in the bead 2' of the adapter 1' likewise forming a turnup. The adapter bead 2' comprises a small metal bead wire 5' around which the turnup is formed. The reinforcer 4' comprises a large bead wire 8' which is a metal tube, or a solid bead wire made from a composite material, or a bundle bead wire (what is meant by a bundle bead wire is a bead wire comprising several superposed layers of circumferential windings of a wire), or alternatively a braided metal bead wire, around which the various rubber-based plies are arranged. The main ply is supplemented by one or more secondary plies, such as a protective ply arranged on the external face 6' of the adapter, or even a sealing ply or inner liner, arranged on the internal face 7' of the adapter, or by other filling or filler rubbers in the bead wire area, as will be explained hereinafter. The difference in diameter between the bead 2' and that of the reinforcer 4' is approximately 1".

Figure 2:
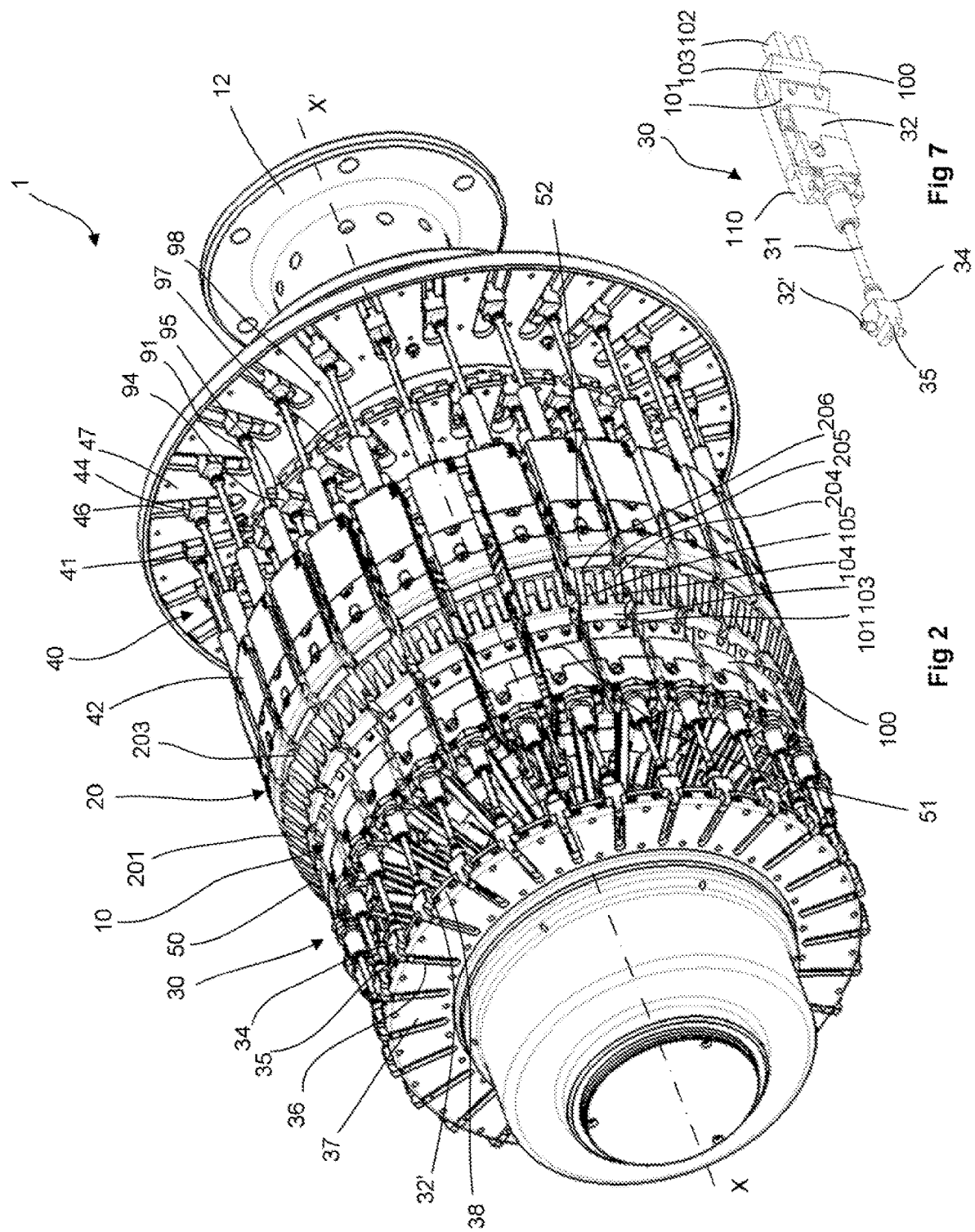
FIG. 2 is a perspective view of a building drum according to the invention.

FIG. 2 illustrates a building drum 1 according to the invention, intended for the manufacture of an adapter for adapting a rim to a tire, the vulcanized green form obtained by assembly then being vulcanized in a mould. The drum 1 is mounted on a stand (not depicted) also comprising mechanical means able to set the drum in rotation about a central axis X-X', for example by coupling and driving a flange 12 of the drum. In what follows, the axial and radial directions are defined with respect to the central axis X-X' which is also an axis of symmetry of the drum.

The drum 1 comprises a first set 10 of segments 100 and a second set 20 of segments 200 which face one another axially or, in other words, are axially juxtaposed. The segments 100, 200 of each set are arranged circumferentially at the periphery of the drum to form an external circumferential face 50 of the drum that forms the working face on which the elements of the green form are arranged. The segments 100, 200 have the same width in the circumferential direction, their respective axial length being chosen according to the dimensions of the adapter that is to be built. The external face 50, when the drum is in the retracted position, has the overall shape of a cylinder of circular cross section in a plane perpendicular to the axis X-X'. Each set of segments is arranged in such a way as to be able to pass from a retracted position to an expanded position and vice versa. When the drum is in the expanded position, as visible in FIG. 2, the segments 100 form an external face 51 of cylindrical shape of a diameter smaller than that of the cylindrically-shaped external face 52 of the segments 200.

The drum also comprises ply-turning devices 30, 40 for turning the plies of rubber material arranged on the external face 50. Each ply-turning device is situated at one end of the drum and is radially expandable at the same time as a set of segments.

The segments 100 of the first set of segments 10 are all identical to one another. There are 27 of them in the present example, but this number could vary. In this example, each segment is rigid and formed of a single piece having an elongate overall shape, the largest dimension of which is parallel to the axis X-X'. As is better visible in cross section (FIG. 3), a segment 100 comprises a front part 101, of inclined overall shape or in the shape of a portion of a cone extended by a rear part 102 in the overall shape of a portion of a cylinder. The front part 101 has a circular groove 103 intended to accept a bead wire. The groove 103 is coaxial with the axis X-X' and has a semicircular radial cross section. The rear part 102 is produced in the form of a comb, in this instance, comprising two teeth 104, 105 (FIG. 2). This comb-shaped part makes it possible to ensure continuity in the axial direction of the external face between the segments of the first set 10 and those of the second set 20. Each segment 100 is fixed to a rigid support 110 (FIGS. 7 & 8a) by means of which it is connected to guide and drive means of the drum.

The segments 200 of the second set of segments 20 are all identical to one another. As with the segments 100, there are 27 of them in the present example, but this number could likewise vary. Each segment 200 is rigid and formed of a single piece having an elongate overall shape, the largest dimension of which is parallel to the axis X-X'. As is better visible in cross section (FIG. 3), a segment 200 comprises a front part 201, of inclined overall shape or in the shape of a portion of a cone extended by a rear part comprising a circular groove 203 coaxial with the axis X-X' and having a semicircular radial cross section. The front part 201 is produced in the form of a comb comprising, in this example, three teeth 204, 205, 206, which interpenetrate with the teeth 104, 105 of an adjacent segment 100. Each segment 200 is fixed to a rigid support 210 (FIG. 5c) by means of which it is connected to guide and drive means of the drum.

Figure 3:
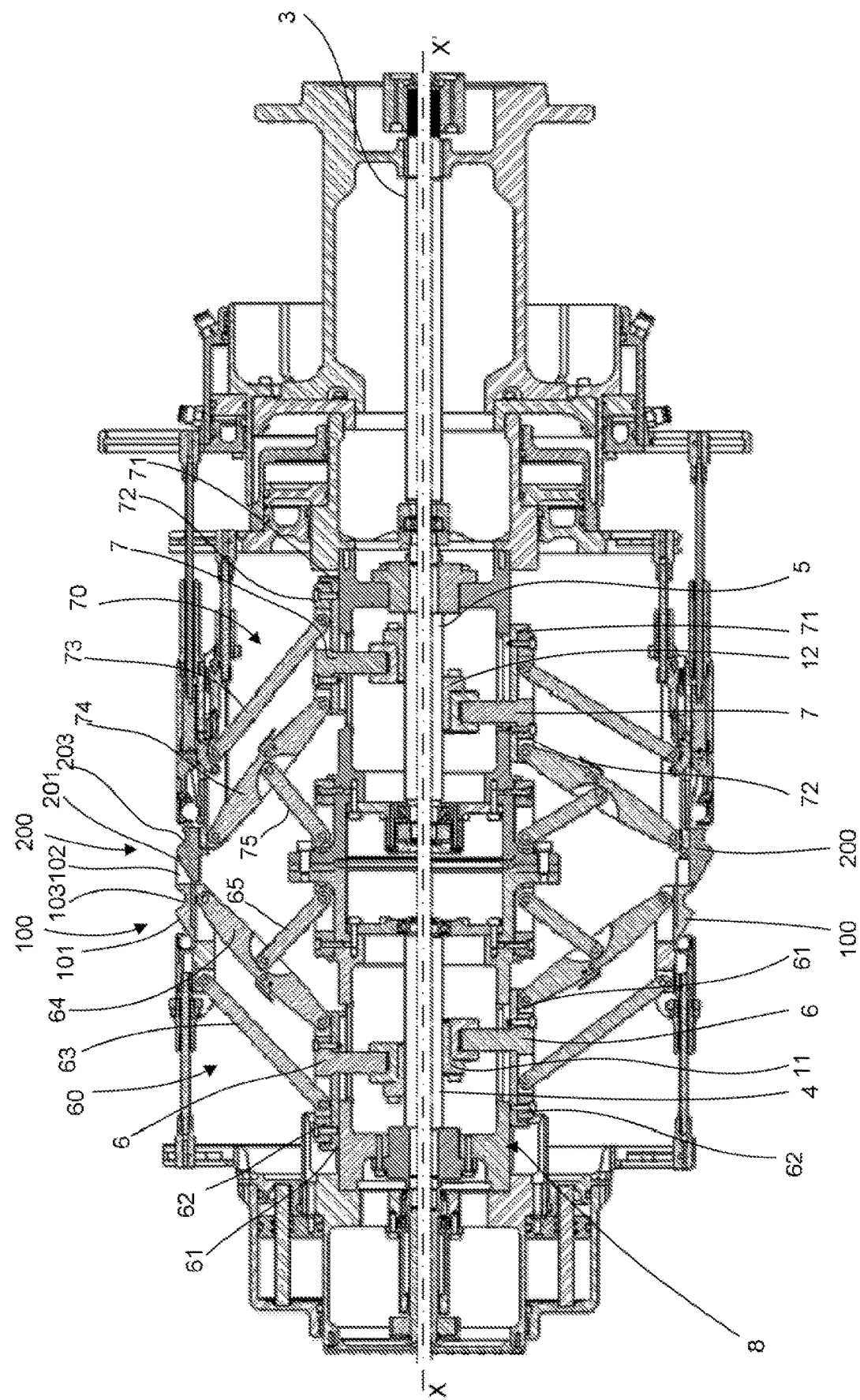
FIG. 3 is a view in axial section of the drum of the invention illustrated in two operating positions.

FIG. 3 is a view in axial section of the drum 1, illustrated in the retracted position in the upper part and in the expanded position in the lower part of the figure, and shows in detail the main elements of the drum, notably those which perform the driving and guiding of the segments 100, 200. The drum 1 comprises a central support or barrel 8 coaxial with a shaft 3 of axis X-X' which passes through it. The barrel 8 is made in two parts 8a, 8b (FIG. 4) which are assembled by screw-fastenings. The shaft 3 is rotationally driven at one of its ends by a motor (not depicted) and in turn rotationally drives two endless screws 4, 5 situated at the centre of the drum. In the example described, the endless screws 4, 5 have the same nominal diameter and the same pitch, but one has a right-hand thread and the other a left-hand thread. Each endless screw 4, 5 is intended, by means of a nut 11, 12 mounted on the screw, to drive a radial rod 6, 7 in an axial movement. This arrangement of the screws and nuts ensures symmetrical movement of the rods on each side of the vertical mid-plane of the drum. Each rod 6, 7 is rigidly fixed to a sleeve 61, 71, mounted with the ability to slide on the barrel 8. The sleeve 61, 71 is connected to a segment 100, 200 support 110 (FIGS. 7 & 8a), 210 (FIG. 5c) by a mechanism 60, 70 of articulated link rods. A sector 100, 200 is rigidly fixed to the segment support 110, 210 in such a way that the position of the latter entirely determines the position of the segment.

More particularly with reference to FIG. 3, the drum comprises, for each segment 100, a link rods support 62 and two rectilinear link rods 63, 64 which are mutually parallel and have the same length, each one being articulated directly to the link rods support 62 and to the support 110 of the segment 100. The same is true of each segment 200, a link rods support 72 being provided on the drum 1, together with two rectilinear link rods 73, 74 which are rectilinear, mutually parallel and have the same length, each one being articulated directly to the link rods support 72 and to the support 210 of the segment 200. The drum additionally comprises an opposition link rod 65 and 75 respectively, mounted articulated directly to the centre of each internal link rod 64 and 74 respectively, and to a support which is itself rigidly fixed to the barrel 8. The two parallel link rods and the opposition link rod form an articulated link rods mechanism 60, 70. There are therefore also 27 of these articulated link rods mechanisms 60, 70 in this particular instance. All of the hinge pins that articulate the link rods are mutually parallel and extend in a direction that is orthogonal to the axis X-X' and not secant therewith. The hinge pins that articulate the opposition link rods 65, 75 to the link rods support and to the internal link rods 64, 74 extend in one and the same plane perpendicular to the axis X-X'. The same goes for the other hinge pins that articulate the link rods 63, 64 and 73, 74 to the support 62, 72 and to the sector support 110, 210, respectively. Furthermore, these properties also hold regardless of the configuration of the drum, that is to say regardless of the position of the segments that is determined by the expansion means. In operation, when the rod 6, 7 is driven in axial translation it drives, via the sleeve 61, 71, the articulated link rods mechanisms 60, 70 which confer a solely radial movement on the segments 100, 200. The screws 4, 5 and the nuts 11, 12 as well as the articulated link rods mechanisms 60, 70, form means for expanding/retracting the drum.

The way in which the endless screws 4 and 5 are rotationally driven will now be explained with reference to FIG. 4 (in which, for the sake of clarity, the elements of the lower part of the drum have not been depicted). The shaft 3 is rotationally driven at its end situated to the right of the drum 1. The shaft 3 then directly turns the screw 5, being coupled to an input end thereof. The screw 5 comprises a pinion 21 at its output end which meshes directly with a pinion 22 borne by a secondary shaft 23 which is parallel to the central shaft 3. The pinions 21 and 22 form a straight-cut gear pair and have a transmission ratio of 1 and their role is to reverse the direction of rotation between the central shaft 3 (or the screw 5) and the secondary shaft 23. The secondary shaft 23 is coupled directly to a first transmission shaft 24 which bears a pinion 25 intended to mesh directly with a pinion 26 of a second transmission shaft 27 of axis parallel to that of the first transmission shaft 24. The pinions 25 and 26 are cylindrical with straight-cut teeth and form a reduction gearset the transmission ratio of which is comprised between 0.45 and 0.7. The second transmission shaft 27 is coupled directly to the screw 4 to which it transmits its rotational movement. The screw 4 and the second transmission shaft 27 have the axis X-X' as their axis of rotation. The various shafts are mounted on rotation bearings or rolling bearings supported within the barrel 8.

Advantageously, the pinions 25, 26 are mounted at the end of the shafts 24, 27 in such a way as to be able to be removed and refitted easily and thus be able to modify the transmission ratio of the reduction gearset. One of the pinions 25, 26 additionally comprises synchronizing means (using splines or a shrunk-on sleeve) for synchronizing it with respect to its drive shaft. This makes it possible to change the speed and therefore the magnitude of the radial movement of one set of segments with respect to the other from a given diameter of the drum in the first working position, which diameter is therefore variable.

During operation, when the central shaft 3 is turned, the screw 5 turns in the same direction and at the same speed as the shaft 3, whereas the screw 4 turns in the same direction, but at a speed lower than that of the shaft 3. The effect of this is that the radial movement of the segments 200 of the second set 20 is greater than that of the segments 100 of the first set 10. The front part 201 of the segments 200 has a tapering shape and is produced in the form of a comb and, as a result, ensures continuity in the axial direction of the external face of the drum when the drum is in the expanded position. Thus, when there is different radial expansion between the two sets of segments, the external face which, when the drum was in the retracted position, was cylindrical and allowed the various components to be laid "flat" (as visible in the upper part of FIG. 3) becomes tapered when the drum is in the expanded position (as visible in the lower part of FIG. 3), thereby making it possible to perform the finishing of the assembly, as will be explained later on.

The drum also comprises, for each segment 100, 200, two ply-turning devices 30, 40 each situated at one end of the drum and each connected to a set of segments in such a way that they can move radially at the same time as these segments.

The first ply-turning device 30 is situated in the left-hand part of the drum; it comprises a rod 31 arranged, in the retracted position, parallel to the axis X-X' and which is directly connected, at its right-hand end, to a hook 32 which is attached to a ply-turning spring 33 mounted slightly under tension on the drum 1. The rod 31 is mounted with the ability to pivot about an axis parallel to that of the articulations articulating the link rods of the assembly 60 to the support 110 of a sector 100. As is best visible in FIG. 7, the rod 31 comprises an end piece forming a buffer 34 equipped with pins 32' arranged in a direction perpendicular to that of the longitudinal axis of the rod 31, the pins 32' being mounted with the ability to pivot in corresponding orifices made in the periphery of an end plate 38 of the drum.

The buffer 34 is rigidly fixed to the rod 31 and is equipped with an end fin 35. The fin 35 is mounted with the ability to slide radially in a guide slot 36 made in a left-hand lateral flange 37 of the drum 1, while at the same time being blocked axially in this slot. The mobile plate 38 and the flange 37 extend in a plane perpendicular to the axis X-X' and are centred on the latter.

The drum comprises a first annular ram 39, for example a pneumatic ram which acts as a means for actuating the axial translation of the ply-turning device 30. The casing of the ram 39 is arranged in a fluidtight manner and with the possibility of sliding axially along a fixed tubular part 28 of the drum 1. More specifically and with reference to FIG. 4, the tubular part 28 is mounted on the barrel 8 and concentrically with respect to the axis X-X'. The annular ram 39 comprises an annular piston 39' mounted fixedly on the tubular part 28 and a rotation-blocking rod 39" which passes in a fluidtight manner through the piston 39'. The casing of the ram 39 is secured to the flange 37 and to the plate 38. When the internal chamber of the ram 39 is supplied with pressurized gas, the casing of the ram 39, the flange 37 and the plate 39 simultaneously move in axial translation.

When it receives the axial translational thrusting movement of the ram 39, the rod 31 moves to the right in FIG. 4 and pushes the spring 33 along the gradient of the front part 101 of a segment 100 in order to turn the plies around the bead wire placed in the groove 103. At the end of the ply-turning, the ram 39 is commanded in the opposite direction and the rod 31 retracts into its initial or rest position. In this particular instance, there are 27 of the ply-turning devices 30.

The second ply-turning device 40 is situated in the right-hand part of the drum; it comprises a rod 41 arranged parallel to the axis X-X' and which is directly connected, at its left-hand end, to a hook 42 which is intended to catch on a ply-turning spring 43, being attached thereto. The right-hand end of the rod 41 comprises a buffer 44 rigidly fixed to the rod 41 and equipped with an end fin 45.

The fin 45 is mounted with the ability to slide radially in a guide slot 46 made in a right-hand lateral flange 47 of the drum 1, while at the same time being blocked axially in this slot. The right-hand lateral flange 47 extends in a plane perpendicular to the axis X-X' and is centred on the latter.

The drum comprises a second annular ram 49, for example a pneumatic ram which forms a first means for actuating the axial translation of the ply-turning device 40. The casing of the ram 49 is arranged in a fluidtight manner and with the possibility of sliding axially along a fixed tubular part 48 of the drum 1. More specifically and with reference to FIG. 4, the tubular part 48 is mounted on the barrel 8 and concentrically with respect to the axis X-X, by means of two tubular components 57 and 58 concentric with respect to the axis X-X' and rigidly fixed thereto. The annular ram 49 comprises an annular piston 49' mounted fixedly on the tubular part 48 and a rotation-blocking rod (not visible in the drawings) which passes in a fluidtight manner through the piston 49'. The casing of the ram 49 is secured to the flange 47. When the internal chamber of the ram 49 is supplied with pressurized gas, the casing of the ram 49 and the flange 37 simultaneously move in axial translation.

Figure 5A:
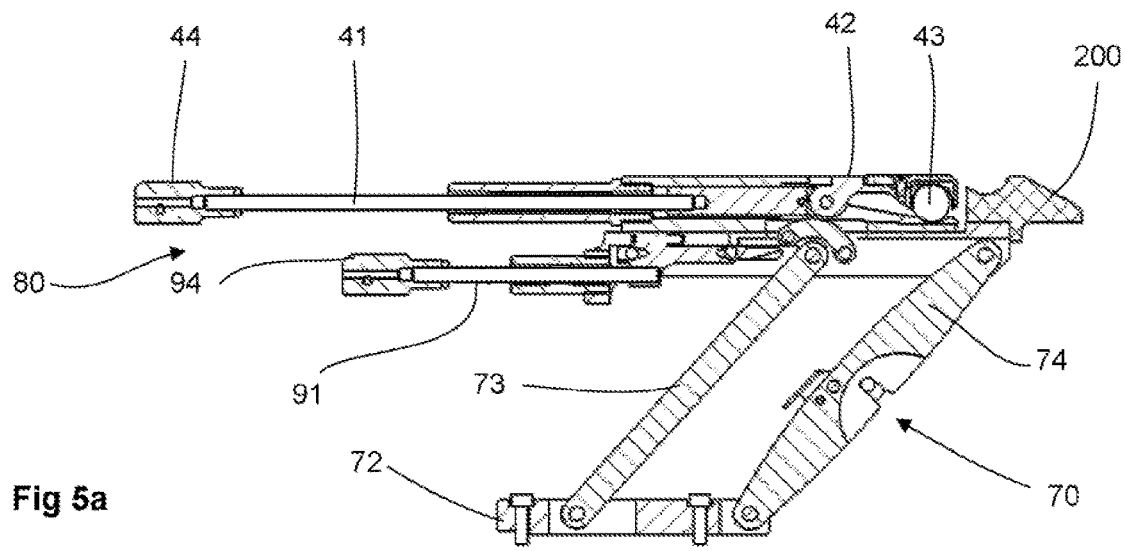
FIGS. 5a to 5c illustrate detailed views of the actuating mechanism for actuating one of the ply-turning devices in various operating positions thereof.
Figure 5B:
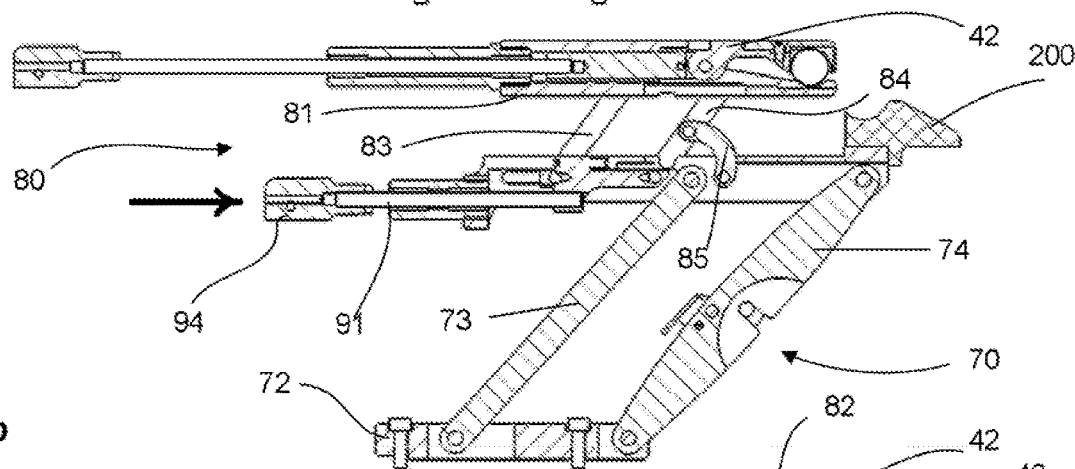
Figure 5C:
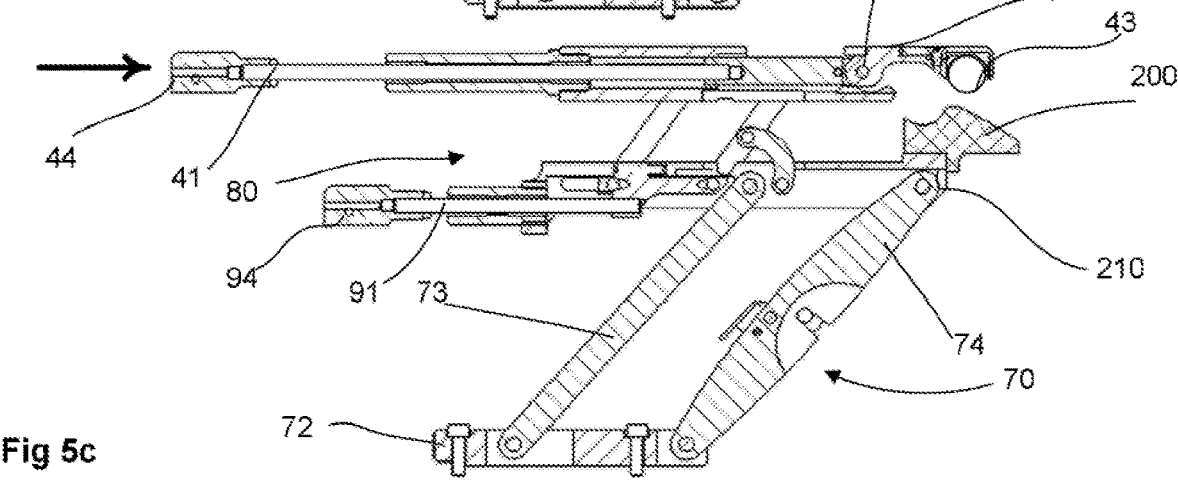

As is best visible in FIGS. 5a to 5c, the hook 42 and the rod 41 are mounted on a support 81 which is itself mounted, by means of an articulated link rods device 80, on the support 210 of a sector 200. The rod 41 is rigidly fixed to the support 81 whereas the hook 42 is mounted with the possibility of pivoting about an axis 82 which extends in a direction orthogonal to the axis X-X'. The articulated link rods mechanism 80 comprises two rectilinear link rods 83, 84 which are mutually parallel and have the same length, each one being articulated directly to the link rods support 81 and to the support 210 of the segment 200. The articulated link rods mechanism 80 additionally comprises an opposition link rod 85 mounted articulated directly to the centre of the link rod 84 and to the support 210. There are therefore also 27 of these articulated link rods mechanisms 80 in this particular instance. All of the hinge pins articulating the link rods of this mechanism are mutually parallel and extend in a direction that is orthogonal to the axis X-X' and not secant therewith. In this particular instance, there are 27 of the ply-turning devices 40. The articulated link rods mechanism 80 is actuated by a thrust rod 91 actuated in an axial movement in the direction of the arrow in FIG. 5b by the action of a third annular ram 59 which, in the example described, is a pneumatic ram. The right-hand end of the rod 91 comprises a buffer 94 rigidly fixed to the rod 91 and equipped with an end fin 95 (FIG. 2) which is mounted with the ability to slide radially inner guide slot produced in a flange 97 while at the same time being axially blocked in this slot.

The third annular ram 59 forms a second means for actuating the axial translation of the ply-turning device 40. The casing of the ram 59 is arranged in a fluidtight manner and with the possibility of sliding axially along a fixed tubular part 58 of the drum 1. More specifically and with reference to FIG. 4, the tubular part 58 is rigidly fixed to the barrel 8 and concentrically with respect to the axis X-X'. The annular ram 59 comprises an annular piston 59' mounted fixedly on the tubular part 58 and a rotation-blocking rod (not visible in the drawings) which passes in a fluidtight manner through the piston 59'. The casing of the ram 59 is secured to the flange 97 and to a plate 98. When the internal chamber of the ram 49 is supplied with pressurized gas, the casing of the ram 59, the flange 97 and the plate 98 simultaneously move in axial translation.

The operation of the second ply-turning device 40 will now be described with reference to FIGS. 5a to 5c. The device is illustrated in the right-hand part with respect to its position within the drum 1 in the preceding figures, but its operation is the same in all positions. The device is depicted in the folded position in FIG. 5a, which means to say that it is in its retracted position underneath the external face of the segments 200. Once the plies and bead wires have been laid on the drum, the ply-turning device 40 is actuated to lift the edges of the plies and in order to do that it adopts the position of FIG. 5b. More specifically, the rod 91 is actuated in axial translation by the action of the ram 59 as indicated by the arrow in that figure, and this causes the link rods of the articulated link rods mechanism 80 to pivot and therefore causes the hook 42 to move radially. Once the plies have been lifted up, the plies then need to be turned around the bead wire laid in the groove 203. In order to do that, the ply-turning device 40 adopts the position illustrated in FIG. 5c, in which the hook 42, which is in the raised position, is pushed in axial translation by the rod 41 under the action of the ram 49. In this position, the plies are turned around the bead wire with the aid of the spring 43 held by the hook 42, which hook pivots about the articulation 82 and allows the spring to follow the falling slope of the segment 200. At the end of the ply-turning, the device 40 is actuated to perform the same movements in the opposite direction until it returns to its position of rest.

The segments 100 and 200 are situated one in the continuation of the other with a distance of approximately 55 mm between the grooves 103 and 203. The drum is preferably covered on its entire length with an elastic sleeve which covers the spaces that there are in the axial and circumferential directions between the segments when the drum is in the expanded position.

Setting the diameter of the drum in its retracted position means that one and the same drum can be used for two different diameters of bead seat, for example for adapters in which the ratio between the dimensions of the two seats is: 17/16 and 18/17 or for 20/19 and 21/20. The setting of the diameter can be done for example by uncoupling the transmission of the screw 4 from the reduction gearset or by removing the pinions of the reduction gearset.

Setting the distance between the bead seats of the adapter amounts to setting the distance between the grooves 103 and 203 of the segments and this is done by using an intermediate spacer piece 29 which is fixed rigidly to the central barrel 8, at the centre thereof, sandwiched between the parts 8a and 8b. Arranging the spacer piece between the segments 100 and 200 makes it possible to vary the distance between the grooves 103 and 203 of the segments, these segments remaining in engagement with one another via their comb-shaped ends.

The components of the drum are made predominantly of metal, for example some of aluminium and others of steel. In one alternative form, the upper parts, or parts for contact with the rubber plies, of the segments 100 and 200 may be produced by a 3-D printing technique (based on a resin or a metallic powder), for greater flexibility.

This drum is used for producing an unvulcanized green form of adapter for a tire. A method for assembling an adapter using the drum will now be described with reference to FIGS. 6a to 6h.

FIG. 6a illustrates the drum in the retracted position, which will be understood to mean the position in which the external face 50 of the drum is cylindrical. The segments 100 and 200 have their external faces at the same level, and this allows the products to be laid "flat". Thus, to begin with, the various plies N illustrated schematically in the figure are laid (what is meant by various plies is at least one protective ply and one carcass ply equipped with reinforcing threads), followed by the bead apex B, these being assembled while the drum 1 is rotating about the axis X-X'. Next, the small bead wire 5' and the large bead wire 8' are positioned facing the grooves 103, 203.

Once all the components have been laid on the drum, the latter is commanded to expand in order to arrive at the expanded configuration illustrated in FIG. 6b. In order to arrive at this configuration, the central shaft 3 is rotated and this results in radial expansion of all the segments simultaneously, but asymmetrically with respect to a vertical midplane passing through the junction between the two sets of segments. Thus, the segments 100 of the first set 10 are at a smaller diameter than the segments 200 of the second set 20 when the drum 1 is in the expanded position, because their respective screws 4, 5 are turned at different speeds. As the drum expands, because of the greater thickness of the plies in the vicinity of the small bead wire 5', this one is the first to be immobilised in the groove 103 of the segments 100, making it possible to control the slippage of the plies on the tapering part of the expanded drum. At the end of expansion, the two bead wires 5' and 8' are entrapped, with the rubber components in the grooves 103, 203 of the segments 100, 200 of the drum, the ply-turning devices 30, 40 still being retracted under the components.

FIG. 6c illustrates the start of the ply-turning of the right-hand side of the green form using the second ply-turning device 40. The hook 42 of the device is actuated in a radial translational movement by the ram 59. The hook moves upwards in the direction of the arrow, making it possible to lift the edges of the components above the bead wire 8'.

FIG. 6d illustrates the next phase of the ply-turning of the right-hand side of the green form using the second ply-turning device 40. The hook 42 of the device is actuated in an axial translational movement by the ram 49. The hook 42 moves to the left in the direction of the arrow, making it possible for the edges of the components to pass over the bead wire 8'. At the same time, the hook 42 rotates about its pivot pin 82, and this allows the end of the hook to carry the spring 43 in a downward movement along the slope 201 of the segments 200. The spring 43, which is mounted slightly under tension when the drum is in the retracted position, thus allows the necessary pressure to be applied to the turned-over edges of the components in order to cause them to adhere to those of the central part of the green form of the adapter and expel the air.

FIGS. 6e and 6f illustrate the withdrawal movements of the device 40, the ply-turning device 40 withdrawing first of all in an axial direction and then in a radial direction as a result of actuation of the rams 49 and 59 in the opposite direction to the direction of deployment. The device finds itself folded in the retracted position of FIG. 6f. An additional step of pressing down the turned-over edges of the products using a roller, working from the outside towards the centre of the green form, is performed after the device 40 has been withdrawn.

FIG. 6g illustrates the start of the ply-turning of the left-hand side of the green form using the first ply-turning device 30. The hook 32 of the device is actuated in an axial translational movement by the ram 39. The hook moves towards the right in the direction of the arrow, making it possible to lift the edges of the components above the bead wire 5'. When the rod 31 is pushed, the hook 32 pivots about the articulation 32', allowing it to rise up the slope 101 of the segment 100 pushing the edges of the rubber plies which thus pass over the bead wire 5'. The hook 32 drives the motion of the spring 33 which applies the necessary pressure to the turned-over edges of the components in order to cause them to adhere to those of the central part of the green form of the adapter and expel the air.

FIG. 6h illustrates the position and, via the arrow, the movement of the device 30 in the retracted position. The withdrawal of the ply-turning device 30 in the axial direction is obtained by actuating the ram 39 in the opposite direction to that of deployment. An additional step of pressing down the turned-over edges of the products using a roller, starting from the outside and working towards the centre of the green form 1", is performed after the device 30 has been withdrawn.

After the two ply-turning devices have been returned to a retracted position underneath the segments, the central shaft 3 is actuated in the opposite direction and the drum is returned to the retracted configuration so that the green form 1" can be extracted. The unvulcanized green form thus obtained is then vulcanized in a mould.

Figure 8A:
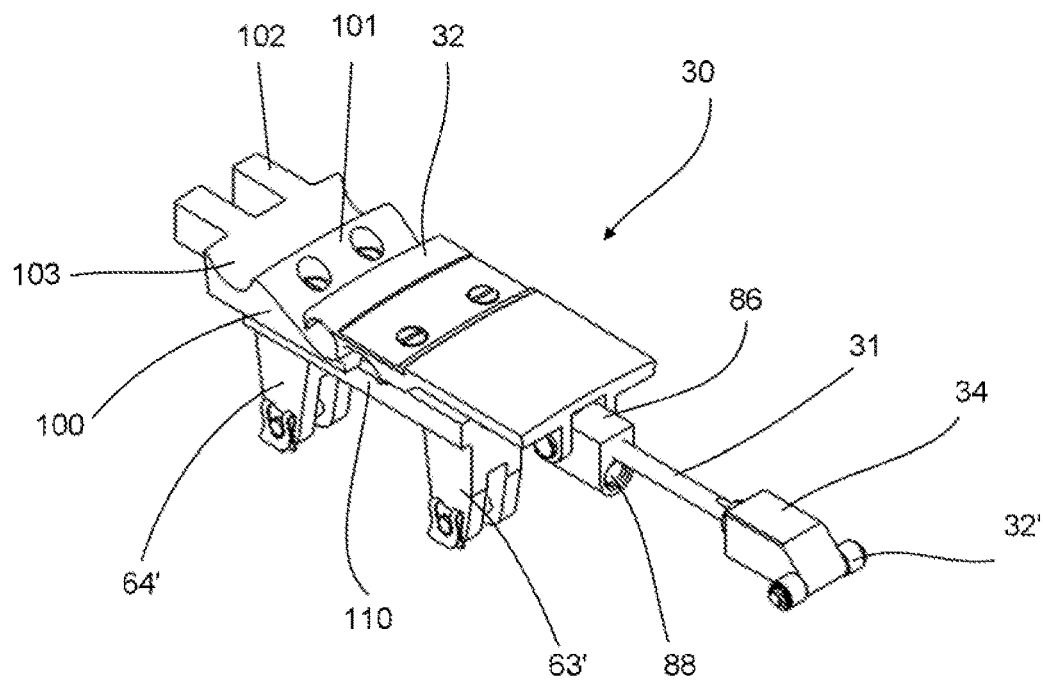
FIGS. 8a to 8c illustrate a perspective view and views in cross section of an alternative form of embodiment of the ply-turning device of FIG. 7.
Figure 8B:
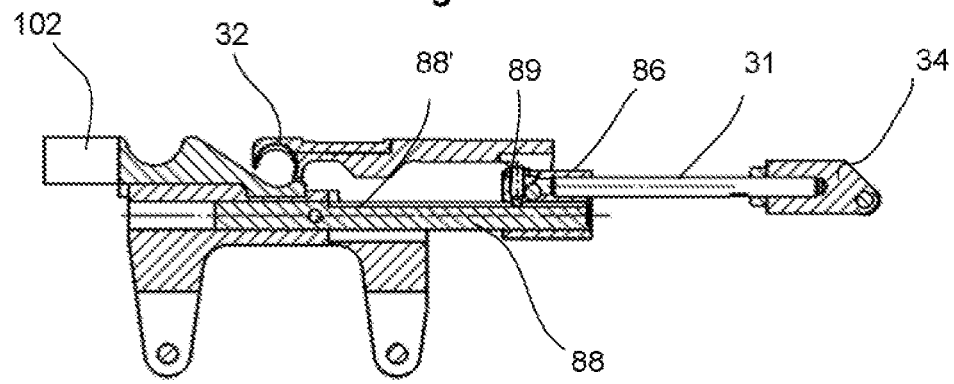
Figure 8C:
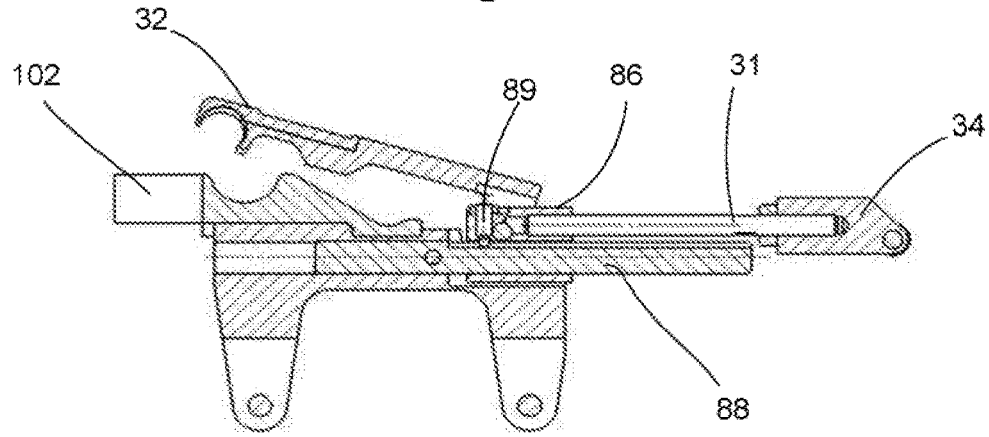

FIG. 8a is a perspective view of another form of embodiment of the ply-turning device 30 of FIG. 7. FIGS. 8b and 8c are views in longitudinal section of the ply-turning device of FIG. 8a illustrated in two operating positions, notably in the rest position in FIG. 8b and in the active ply-turning position in FIG. 8c. The ply-turning device 30 according to this alternative form allows the pivot connection needed for following the tapering shape of the front part 101 of the sector 100 to be dissociated from the sliding connection needed for the ply-turning device 30 to advance in the axial direction. In order to achieve that, an axial-translation guide rod 88 is placed at the rear of the support 110 of the segments 100, the rod comprising a longitudinal slot 88' along which a slide 86, held translationally by means of a set screw 89 which remains in the longitudinal slot 88', is able to effect a translational movement. This slide 86 bears a pin 87 of direction perpendicular to the axis of the drum, which pin forms a pivot connection on which the hook 32 is articulated. For that, the hook 32 has been modified to include a pivot-mounting about the pin 87. Thus, in this alternative form of embodiment of the ply-turning device, only the hook 32 pivots about the pin 87 during the ply-turning operation, whereas the thrust rod 31 remains parallel to the axis of the drum in its axial translational movement.

The ply-turning device 30 illustrated in FIGS. 8a to 8c is mounted within the building drum 1 of the invention in place of the device 30 of FIG. 7. For that, it comprises connecting flanges 63' and 64' for connection to the link rods 63 and 64 respectively, and a buffer 34 connecting it to the flange 37 and therefore to the ram 39. The ply-turning device 30 according to this alternative form makes it possible to maintain a purely axial movement of the thrust rod 31 during ply turning, thereby making it possible to avoid generating a bending moment that would be induced by an angled movement of the rod of the ply-turning device of FIG. 7. Thus it has been found that, in certain instances, such an angled movement could cause bracing of the buffer 34 against the plate 36, or even deformation of the thrust rods 31.

Of course, numerous modifications may be made to the invention without departing from the scope thereof.

Use could be made of individual rams for actuating the ply-turning devices, in place of the annular rams.

The invention claimed is:

1. A radially expandable building drum for manufacturing an adapter for mounting a tire on a rim, the drum comprising:
   a central shaft;
   a first set of segments; and
   a second set of segments,
   wherein the segments of the first set and the segments of the second set are rigid and elongated elements arranged circumferentially around the central shaft to form a generally cylindrically shaped external face of the drum,
   wherein the segments of the first set and the segments of the second set are axially juxtaposed,
   wherein the segments of the first set and the segments of the second set are structured to enable a different radial expansion of the first set relative to the second set, between two working positions, and
   wherein an axially internal face of the segments of the first set includes teeth that axially interpenetrate with teeth of an axially external face of the segments of the second set.

2. The drum according to claim 1, wherein an external face of each segment of the first set and each segment of the second set includes a groove for accommodating a bead wire.

3. The drum according to claim 1, further comprising a movement actuator structured to cause movement of the segments of the first set and the segments of the second set between:
   a first working position in which the segments of the first set and the segments of the second set are in a retracted position, and in which the external face of the drum is substantially cylindrical in shape and has a single diameter along a length of the external face of the drum, and
   a second working position in which the segments of the first set and the segments of the second set are in an expanded position, so that the segments of the second set exhibit a greater diameter than the segments of the first set, and so that the external face of the drum includes two parts of substantially cylindrical shape of different diameters.

4. The drum according to claim 1, further comprising a single driver structured to drive movement of the segments of the first set and the segments of the second set simultaneously.

5. The drum according to claim 1, further comprising a driver structured to drive movement of the segments of the first set and the segments of the second set at different speeds relative to one another.

6. The drum according to claim 5, wherein each of the first set of segments and the second set of segments is moved in radial translation using respective screw and nut combination devices, with each screw of the screw and nut combination devices receiving rotational movement of the central shaft.

7. The drum according to claim 6, wherein one of the screws of the screen and nut combination devices receives the rotational movement of the central shaft via a set of gears exhibiting a reduction ratio.

8. The drum according to claim 7, wherein pinions of the set of gears are interchangeable and mounted so as to be able to be synchronized in any relative position.

9. The drum according to claim 6, wherein each of the first set of segments and the second set of segments is connected to a corresponding one of the screw and nut combination devices by a respective articulated links mechanism.

10. The drum according to claim 1, further comprising a flexible sleeve structured to cover the external face of the drum.

11. The drum according to claim 1, further comprising a ply-turning device located at each end of the drum, each ply-turning device being radially expandable at a same time as a set of segments.

12. The drum according to claim 11, wherein the ply-turning devices are retractable under the external face of the drum.

13. The drum according to claim 11, further comprising a ply-turning actuator for actuating one of the ply-turning devices in an axial translational movement.

14. The drum according to claim 11, further comprising a ply-turning actuator for actuating one of the ply-turning devices in an axial translational movement and in a radial translational movement.

* * * * *